United States Patent
Douglas et al.

(10) Patent No.: US 8,146,567 B2
(45) Date of Patent: Apr. 3, 2012

(54) TWO-STEP VALVE LIFTER CONTROL SYSTEMS AND METHODS

(75) Inventors: Scot A. Douglas, Howell, MI (US); Donovan L. Dibble, Utica, MI (US); Joshua D. Cowgill, Hartland, MI (US)

(73) Assignee: GM Global Technology Operations LLC

( * ) Notice: Subject to any disclaimer, the term of this patent is extended or adjusted under 35 U.S.C. 154(b) by 321 days.

(21) Appl. No.: 12/607,381

(22) Filed: Oct. 28, 2009

(65) Prior Publication Data

US 2011/0094465 A1    Apr. 28, 2011

(51) Int. Cl.
F02D 13/00    (2006.01)
F02D 13/02    (2006.01)

(52) U.S. Cl. ...................................................... 123/346

(58) Field of Classification Search .................. 123/346, 123/345, 347, 348, 90.15, 90.16
See application file for complete search history.

(56) References Cited

U.S. PATENT DOCUMENTS

| | | | | |
|---|---|---|---|---|
| 4,759,321 A | * | 7/1988 | Matsumoto et al. | 123/90.15 |
| 7,073,469 B2 | * | 7/2006 | Nohara et al. | 123/90.16 |
| 2007/0204821 A1 | * | 9/2007 | Aoyama et al. | 123/90.16 |
| 2008/0216779 A1 | * | 9/2008 | Watanabe et al. | 123/90.15 |

FOREIGN PATENT DOCUMENTS

JP    2007198284 A  *  8/2007

* cited by examiner

*Primary Examiner* — Mahmoud Gimie

(57) ABSTRACT

A valve lifter control system includes a valve lifter control module and a forced transition determination module. The valve lifter control module determines a desired lift state of a valve lifter based on at least one of engine speed and engine load. The forced transition determination module initiates a forced transition of the valve lifter from the low-lift state to the high-lift state based on manifold vacuum independently of the desired lift state.

17 Claims, 3 Drawing Sheets

TWO-STEP VALVE LIFTER CONTROL SYSTEMS AND METHODS

FIELD

The present disclosure relates to valve lifters for internal combustion engines.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An internal combustion engine includes intake valves that are selectively opened to draw air into cylinders of the engine. Two-step valve lifters may be used to control opening and closing of the intake valves. The two-step valve lifters are selectively operable between a low-lift state and a high-lift state. When the valve lifters are in the high-lift state, the intake valves allow for greater displacement, increasing the amount of air and fuel taken into the engine and increasing engine torque. When lower engine torque is desired, the valve lifters may be switched to a low-lift state to reduce displacement of the intake valves, thereby reducing engine pumping losses.

SUMMARY

A valve lifter control system includes a valve lifter control module and a forced transition determination module. The valve lifter control module determines a desired lift state of a valve lifter based on at least one of engine speed and engine load. The forced transition determination module initiates a forced transition of the valve lifter from the low-lift state to the high-lift state based on manifold vacuum independently of the desired lift state.

A method of controlling a two-step valve lifter includes determining a desired lift state of a valve lifter based on at least one of engine speed and engine load, and transitioning the valve lifter from a low-lift state to a high-lift state based on manifold vacuum independently of the desired lift state.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
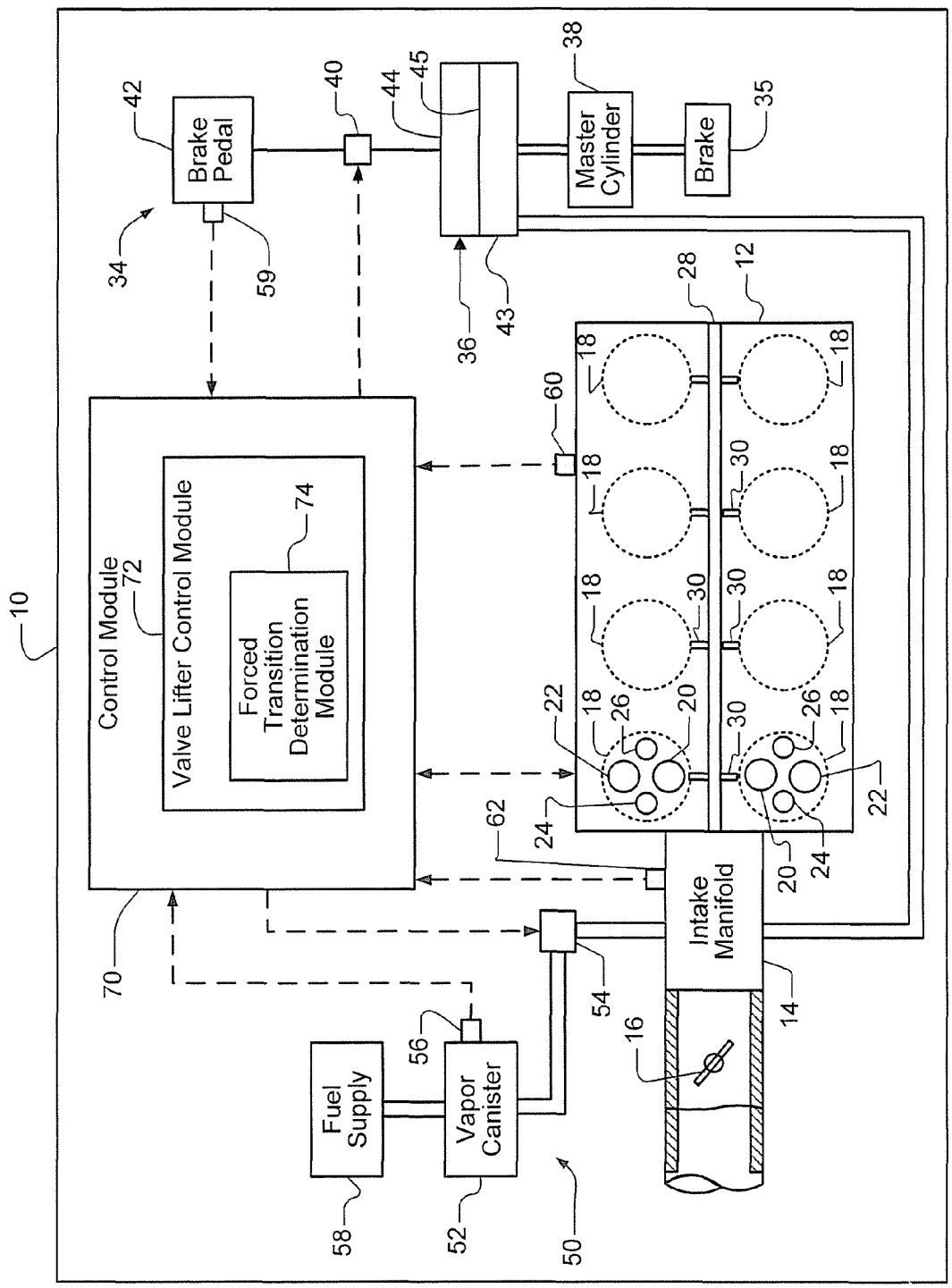
FIG. 1 is a functional block diagram of an engine system that includes a valve lifter control module in accordance with the teachings of the present disclosure.

The following description is merely exemplary in nature and is not intended to limit the present disclosure, application, or uses. For purposes of clarity, the same reference numbers will be used in the drawings to identify similar elements. As used herein, the term "module" refers to an application specific integrated circuit (ASIC), an electronic circuit, a processor (shared, dedicated, or group) and memory that execute one or more software or firmware programs, a combinational logic circuit, or other suitable components that provide the described functionality.

A valve lifter control system and method of the present disclosure transitions a valve lifter from a low-lift state to a high-lift state based on manifold vacuum. The valve lifter control system initiates a forced transition from the low-lift state to the high-lift state independently of a determination of a desired lift state based on engine speed and/or engine load. The forced transition enables the intake manifold to have a manifold vacuum equal to or above a threshold to ensure effective performance of an engine component that requires manifold vacuum for effective performance.

Referring now to FIG. 1, an engine system 10 includes an engine 12 that combusts an air and fuel mixture to produce drive torque. Air is drawn into an intake manifold 14 through a throttle 16. The throttle 16 regulates mass air flow into the intake manifold 14. Air within the intake manifold 14 is distributed into a plurality of cylinders 18. Although eight cylinders 18 are illustrated, the engine 12 may have any number of cylinders, such as, for example only, 2, 4, 5, 6, 10, or 12 cylinders. The engine 12 may be a straight or V engine.

Each cylinder 18 includes an intake valve 20, an exhaust valve 22, a fuel injector 24, and a spark plug 26. The fuel injectors 24 inject fuel that is combined with the air as the air is drawn into the cylinders 18 through intake ports. The fuel injectors 24 are controlled to provide a desired air-to-fuel (A/F) ratio within each cylinder 18. The intake valves 20 are selectively opened and closed to enable the air/fuel mixture to enter the cylinders 18. A piston (not shown) compresses the air/fuel mixture within each cylinder 18. The spark plugs 26 ignite the air/fuel mixture to result in combustion of the air/fuel mixture, thereby generating combustion force to drive pistons in the cylinders 18. The pistons drive a crankshaft (not shown) to produce drive torque. Combustion exhaust within the cylinders 18 is forced out exhaust ports when the exhaust valves 22 are opened. The exhaust is treated in an exhaust system (not shown).

Timing for opening and closing the intake valves 20 is controlled by an intake camshaft 28. The intake camshaft 28 is synchronized to a crankshaft (not shown) by a chain or belt. The intake camshaft 28 generally includes cam lobes (not shown) that operate the plurality of intake valves 20. The cam lobes may be designed to have a first profile for a low lift and a second profile for a high lift.

The intake valves 20 are connected to the intake camshaft 28 by a plurality of valve lifters 30. The cam lobes on the intake camshaft 28 are in operative contact with the valve lifters 30. The valve lifters 30 lift the intake valves 20 as the intake camshaft 28 rotates.

The intake camshaft 28 may include a low-lift cam lobe and a high-lift cam lobe for each valve. The valve lifters 30 enable two discrete valve states (e.g. a low-lift state or a high-lift state) on the intake valves 20. During a low-lift state, the valve lifters 30 contact the low-lift cam lobes and the valve lifters 30 are moved to a first position according to prescribed geometry of the low-lift cam lobes. Therefore, the intake valves 20 are opened a first predetermined amount. During a high-lift state, the valve lifters 30 contact the high-lift cam lobes and are moved to a second position according to prescribed geometry of the high-lift cam lobes. Therefore, the intake valves 20 are opened a second predetermined amount greater than the first predetermined amount.

In normal situations, the valve lifters 30 may be transitioned from the low-lift state to the high-lift state and vice versa based on demanded engine speed and load. The camshaft profiles may be designed to enable the valve lifters to operate in the low-lift state most of the time. When an engine operates at an elevated engine speed, such as 4,000 revolutions per minute (RPMs), the valve lifters may be transitioned to the high-lift state.

A hydraulic brake system 34 includes a brake 35, a vacuum booster 36, a master cylinder 38, a check valve 40, and a brake pedal 42. The brake 35 provides braking force to a vehicle when the brake pedal 42 is depressed. When the brake pedal 42 is depressed, the master cylinder 38 is moved to activate the brake 35. The vacuum booster 36 is provided between the master cylinder 38 and the brake pedal 42 to reduce the braking effort by a driver. The vacuum booster 36 includes a first chamber 43, a second chamber 44, and a diaphragm 45 therebetween. The intake manifold 14 communicates with the first chamber 43. The check valve 40 communicates with the second chamber 44. When the brake pedal 42 is not depressed, the first chamber 43 and the second chamber 44 have a pressure equal to the MAP. When the brake pedal 42 is depressed, the check valve 40 is opened to let in atmospheric pressure air to the second chamber 44. The pressure difference between the first chamber 43 and the second chamber 44 results in a force applied to the master cylinder 38. The pressure difference is a difference between the barometric pressure and the MAP and thus is equal to manifold vacuum. This force, in addition to the brake pedal force, pushes the brake 35 to generate a braking force.

A canister purge system 50 includes a vapor canister 52 and a purge valve 54. The vapor canister 52 communicates with a fuel supply 58, such as a fuel tank. The vapor canister 52 includes a fuel vapor absorbing material (not shown) that absorbs the fuel vapor from the fuel supply 58 to reduce fuel vapor released to the atmosphere from the fuel supply 58. The vapor canister 52 communicates with the intake manifold 14 through the purge valve 54. When the purge valve 54 is opened, the vapor canister 52 is exposed to MAP in the intake manifold 14 and ambient air that passes through the purge valve 54. MAP is less than the barometric pressure of the ambient air. The difference between the MAP and the barometric pressure is the manifold vacuum, which draws the fuel vapor from the fuel vapor absorbing material into the intake manifold 14. The fuel vapor is mixed with ambient air for ingestion in the cylinders 18.

A plurality of sensors are provided to monitor engine operating conditions. The plurality of sensors include, but are not limited to, a canister sensor 56, a brake pedal position sensor 59, an engine speed sensor 60, and a manifold absolute pressure (MAP) sensor 62. The canister sensor 56 is provided at the vapor canister 52 to monitor the vapor concentration in the vapor canister 52. The brake pedal position sensor 59 monitors depression of the brake pedal 42. The engine speed sensor 60 is provided at the engine 12 and measures an engine speed. The MAP sensor 62 monitors the MAP in the intake manifold 14.

A control module 70 includes a valve lifter control module 72 that controls the valve lifters 30 between a high-lift state and a low-lift state. The valve lifter control module 72 includes a forced transition determination module 74 that initiates a forced transition of the valve lifters 30 from the low-lift state to the high-lift state based on a duration that the valve lifters 30 are in the low-lift state, vapor concentration in the vapor canister 52, and/or manifold vacuum.

Figure 2:
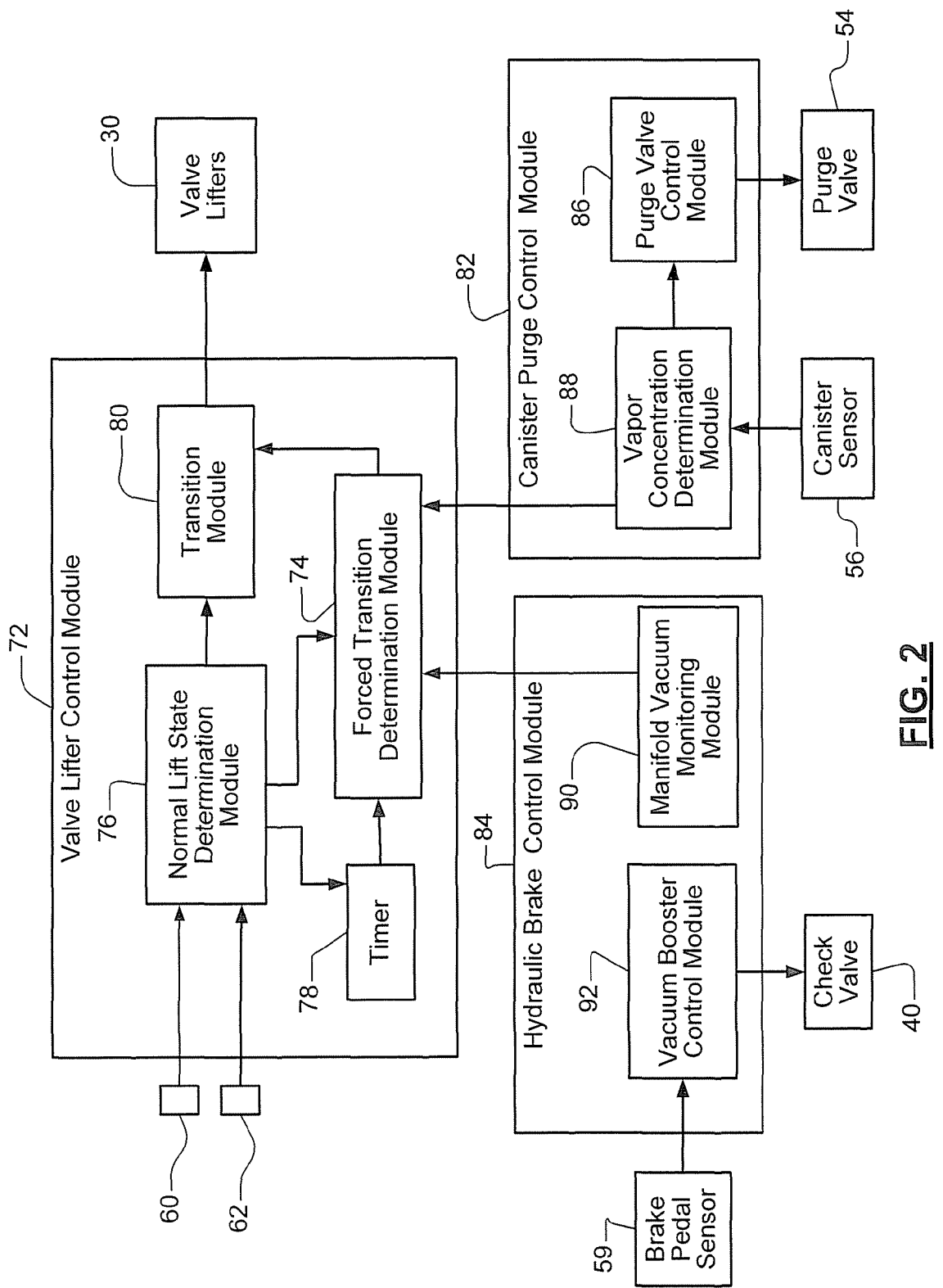
FIG. 2 is a functional block diagram of a valve lifter control module in accordance with the teachings of the present disclosure.

Referring to FIG. 2, the valve lifter control module 72 according to the present disclosure includes the forced transition determination module 74, a normal lift state determination module 76, a timer 78, and a transition module 80. The valve lifter control module 72 communicates with a canister purge control module 82 and a hydraulic brake control module 84. The forced transition determination module 74 determines whether a forced transition is desired based on signals from the timer 78, the hydraulic brake control module 84, and the canister purge control module 82.

The normal lift state determination module 76 determines a desired lift-state (i.e., low-lift or high-lift) based on engine speed and/or engine torque. When the normal lift state determination module 76 determines a low-lift state and the valve lifters 30 are in the high-lift state, the transition module 80 transitions the valve lifters 30 from the high-lift state to the low-lift state. The normal lift state determination module 76 also receives signals from the MAP sensor 62 and determines when the timer 78 should be activated. The timer 78 is activated to increment the time when the valve lifters 30 are in the low-lift state and when the MAP is above a first threshold. The timer 78 may be reset to zero when the MAP decreases below a second threshold (taking hysteresis into account) or when a high lift is commanded.

When the valve lifters 30 are transitioned to the low-lift state, the MAP in the intake manifold 14 starts to increase and the manifold vacuum starts to decrease. Manifold vacuum is equal to a difference between a barometric pressure and the MAP. As the duration of the valve lifters 30 in the low-lift state increases, the MAP increases until the MAP reaches the barometric pressure. When the MAP is close to the barometric pressure, the manifold vacuum is close to zero. Performance of hydraulic brake system 34 and the canister purge system 50 is based on manifold vacuum. The greater the manifold vacuum, the better the performance of the canister purge system 50 and the hydraulic brake system 34. Therefore, when the valve lifters 30 are in the low-lift state for an extended period of time, the manifold vacuum may become too low for effective canister purge if a canister purge is desired. Moreover, when the manifold vacuum becomes too low, the hydraulic brake system 34 may not provide desired braking force.

The forced transition determination module 74 determines whether a forced transition from the low-lift state to the high-lift state is desired based on signals from the timer 78, the hydraulic brake control module 84, and the canister purge control module 82. The forced transition is initiated to ensure that the manifold vacuum is at or above a threshold to ensure desired performance of engine components (such as the canister purge system 50 and the hydraulic brake system 34) that use manifold vacuum for their performance.

The canister purge control module 82 controls the canister purge system 50. The canister purge control module 82 includes a purge valve control module 86 and a vapor concentration determination module 88. The vapor concentration determination module 88 determines vapor concentration in the vapor canister 52. Under normal canister purge strategy, when the vapor concentration exceeds a threshold concentration, the purge valve control module 86 opens the purge valve 54. The manifold vacuum draws the purge vapor in the vapor canister 52 to the intake manifold 52.

To ensure improved performance of the canister purge system 50, the forced transition determination module 74 initiates a forced transition before the vapor concentration exceeds the threshold concentration. The transition module 80 transitions the valve lifters 30 from the low-lift state to the high-lift state to reduce the MAP and to increase the manifold vacuum. For example, the vapor concentration determination module 88 may send a signal to the forced transition determination module 74 when the vapor concentration exceeds a predetermined value. The predetermined value is less than the threshold concentration that triggers the opening of the purge valve 54.

Alternatively, the forced transition determination module 74 may initiate a forced transition when the timer 78 indicates that the valve lifters 30 have been in the low-lift state and the MAP has been above the first threshold for a predetermined period of time. The longer the valve lifters 30 are in the low-lift state, the less the manifold vacuum. The predetermined period of time may be determined based on a threshold manifold vacuum.

The timer 78 may be reset to zero when the MAP decreases below a second threshold (taking hysteresis into account) or when a high lift is commanded. When the valve lifters 30 are transitioned to the low-lift state, the MAP in the intake manifold 14 starts to increase and the manifold vacuum starts to decrease. The MAP may decrease when a driver reduces a pedal input to reduce the throttle opening. When the MAP decreases below the second threshold, manifold vacuum may increase above the threshold vacuum for optimum performance of the hydraulic brake system 34 and the canister purge system 50. Therefore, the timer 78 may be reset to zero to keep the valve lifters in the low-lift state for a longer duration, thereby improving fuel economy.

The hydraulic brake control module 84 controls the hydraulic brake system 34 and includes a manifold vacuum monitoring module 90 and a vacuum booster control module 92. The vacuum booster control module 92 opens the check valve 40 in response to depression of the brake pedal 42. The depression of the brake pedal 42 is detected by the brake pedal sensor 59. Under normal brake control strategy, when the brake pedal 42 is depressed, the check valve 40 is opened to allow atmospheric air to enter the vacuum booster 36. The magnitude of the braking force depends on the manifold vacuum. The manifold vacuum monitoring module 90 monitors the manifold vacuum to ensure that the manifold vacuum is equal to or above a threshold when the hydraulic brake system 34 is activated.

Therefore, when the manifold vacuum is below a threshold vacuum (due to, for example, an extended period of time in which the valve lifters 30 are in the low-lift state), the manifold vacuum monitoring module 90 generates and sends a signal to the forced transition determination module 74. The forced transition determination module 74 determines that a forced transition is desired and the transition module 80 transitions the valve lifters 30 from the low-lift state to the high-lift state. When the valve lifters 30 are in the high-lift state, the MAP starts to decrease and the manifold vacuum starts to increase. Therefore, the forced transition determination module 74 ensures that the intake manifold 14 provides at least a threshold manifold vacuum to allow for effective performance of the hydraulic brake system 34.

It is understood and appreciated that the threshold manifold vacuum for effective braking may or may not be the same as that for effective canister purge. Therefore, the forced transition determination module 74 may initiate a forced transition at a threshold that ensures effective performance of both the hydraulic brake system 34 and the canister purge system 50.

Figure 3:
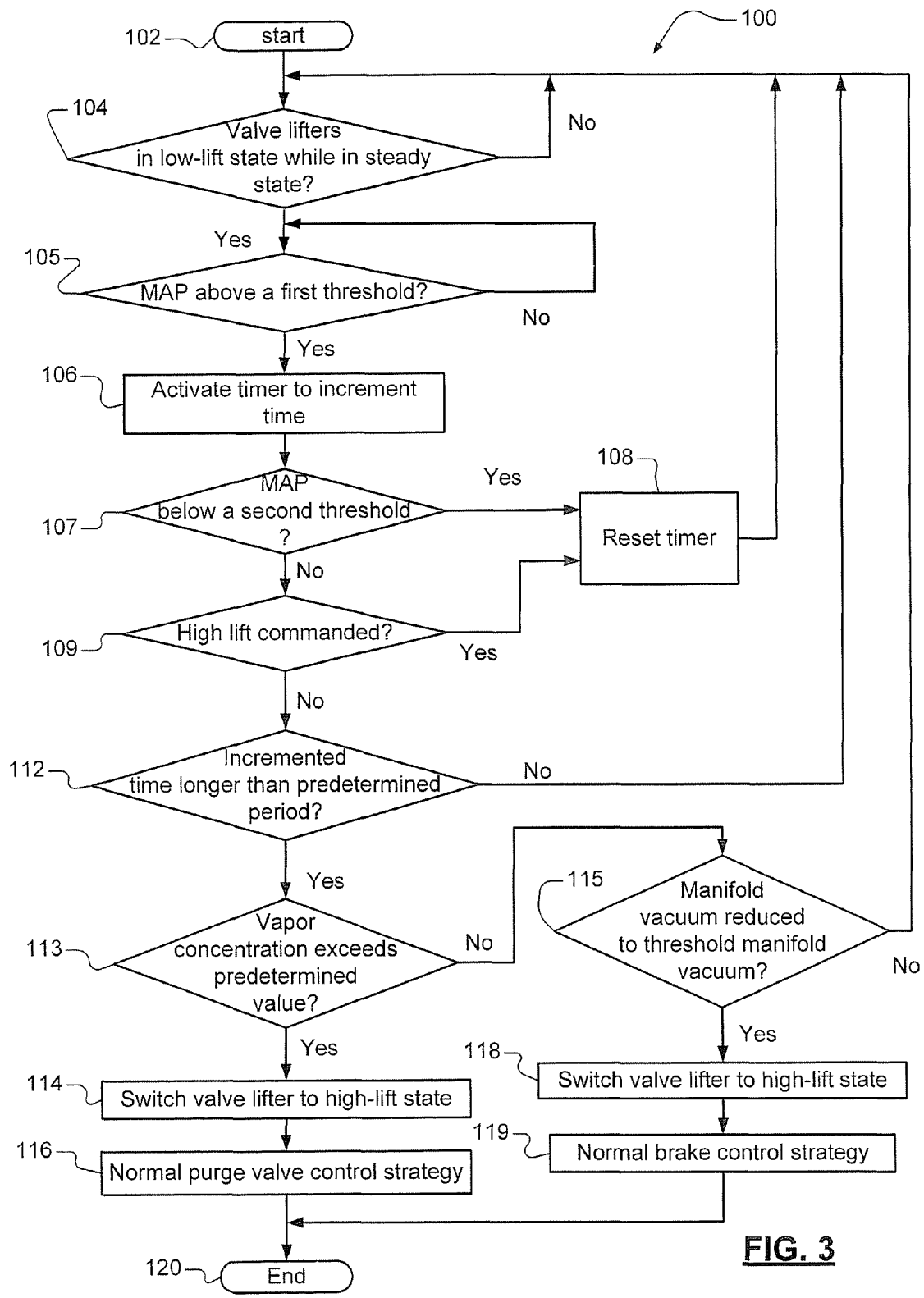
FIG. 3 is a flow diagram illustrating a valve lifter control method in accordance with the teachings of the present disclosure.

Referring to FIG. 3, a valve lifter control method 100 starts in step 102. The valve lifter control module 72 determines whether the valve lifters 30 are in the low-lift state when the engine 12 is running in a steady state in step 104. When the valve lifters 30 are in the low-lift state while the engine 12 is running in a steady state in step 104, the normal lift state determination module 76 determines whether the MAP is above a first threshold in step 105. If true, the method 100 proceeds to step 106. If false, the normal lift state determination module 76 continues to monitor the MAP. In step 106, the timer 78 is activated to increment time. The normal lift state determination module 76 continues to monitor MAP. When the MAP is below a second threshold in step 107, the timer 78 is reset in step 108 and the method 100 returns to step 104. When the MAP is not below the second threshold in step 107, the method 100 proceeds to step 109. In step 109, the normal lift state determination module 76 determines whether a high lift is commanded. If true, the method 100 continues to step 108 to reset the timer 78. If false, the method 100 continues to step 112. When the forced transition determination module 74 determines that the incremented time is longer than a predetermined period in step 112, the method 100 proceeds to step 113. If false, the method 100 returns to step 104 to continue increment time while monitoring the MAP and the lift state.

In step 113, the forced transition determination module 74 determines whether the vapor concentration exceeds a predetermined value. When the vapor concentration exceeds the predetermined value in step 113, the transition module 80 transitions the valve lifters 30 to the high-lift state in step 114. The canister purge control module 82 monitors the vapor concentration and opens the purge valve 54 according to the normal purge valve control strategy in step 116.

For example, when the vapor concentration exceeds a threshold concentration, the purge valve 54 is opened to purge the vapor canister 52. The predetermined value is set to be less than the threshold concentration. Therefore, the valve lifters 30 are already in the high-lift state to increase the manifold vacuum when a need for vapor purge arises. The increased manifold vacuum effectively draws the vapor into the intake manifold 14.

Referring back to step 113, when the vapor concentration does not exceed the predetermined value, the hydraulic brake control module 84 determines whether the manifold vacuum is reduced to a threshold manifold vacuum in step 115. When the manifold vacuum is below the threshold manifold vacuum in step 115, the forced transition control module 74 commands the transition module 80 to transition the valve lifters 30 to the high-lift state in step 118. The hydraulic brake control module 84 monitors the brake pedal 42 and activates the hydraulic brake system 34 according to normal brake control strategy in step 119. The method 100 ends in step 120.

While not shown in the drawings, it is understood and appreciated that additional steps may be included between steps 108 and 116 to transition the valve lifters 30 from the low-lift state to the high-lift state in response to other predetermined conditions that indicate relatively low manifold vacuum or that requires an increased manifold vacuum for safety reasons. For example, when the road is slippery or the vehicle is uphill or downhill, the threshold manifold vacuum may be set greater to prepare the hydraulic brake system 34 for greater manifold vacuum.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A valve lifter control system comprising:
   a valve lifter control module that determines a desired lift state of a valve lifter based on at least one of engine speed and engine load; and
   a forced transition determination module that initiates a forced transition of the valve lifter from a low-lift state to a high-lift state based on manifold vacuum independently of the desired lift state,
   wherein the forced transition determination module initiates the forced transition based on a duration of the valve lifter in the low-lift state.

2. The valve lifter control system of claim 1 further comprising a timer that is activated when the valve lifter is transitioned from the high-lift state to the low-lift state and when mass absolute pressure (MAP) is above a first threshold.

3. The valve lifter control system of claim 2 wherein the timer is reset to zero when the MAP is reduced below a second threshold or when the high lift state is commanded.

4. The valve lifter control system of claim 1 wherein the forced transition determination module initiates the forced transition when an engine operates in a steady-state and when the valve lifter is in the low-lift state for at least a predetermined period.

5. The valve lifter control system of claim 4 wherein the predetermined period corresponds to a threshold manifold vacuum.

6. A valve lifter control system comprising:
   a valve lifter control module that determines a desired lift state of a valve lifter based on at least one of engine speed and engine load; and
   a forced transition determination module that initiates a forced transition of the valve lifter from a low-lift state to a high-lift state based on manifold vacuum independently of the desired lift state,
   wherein the forced transition determination module communicates with at least one of a purge valve control module and a hydraulic brake control module and initiates the forced transition based on signals from at least one of the hydraulic brake control module and the purge valve control module.

7. The valve lifter control system of claim 6 wherein the forced transition determination module initiates the forced transition when a purge vapor concentration exceeds a predetermined value.

8. The value lifter control system of claim 7 wherein the predetermined value is less than a threshold concentration that triggers opening of a purge valve of a canister purge system.

9. The valve lifter control system of claim 6 wherein the forced transition determination module initiates the forced transition when the manifold vacuum is below a threshold.

10. A method of controlling a valve lifter comprising:
    determining a desired lift state of a valve lifter based on at least one of engine speed and engine load;
    transitioning the valve lifter from a low-lift state to a high-lift state based on manifold vacuum independently of the desired lift state; and
    transitioning the valve lifter from the low-lift state to the high-lift state based on a duration of the valve lifter in the low-lift state.

11. The method of claim 10 further comprising transitioning the valve lifter from the low-lift state to the high-lift state when the manifold vacuum is below a threshold.

12. A method of controlling a valve lifter comprising:
    determining a desired lift state of a valve lifter based on at least one of engine speed and engine load;
    transitioning the valve lifter from a low-lift state to a high-lift state based on manifold vacuum independently of the desired lift state; and
    transitioning the valve lifter from the low-lift state to the high-lift state when an engine operates in a steady-state and when the valve lifter is in the low-lift state for at least a predetermined period.

13. A method of controlling a valve lifter comprising:
    determining a desired lift state of a valve lifter based on at least one of engine speed and engine load;
    transitioning the valve lifter from a low-lift state to a high-lift state based on manifold vacuum independently of the desired lift state; and
    starting a timer when the valve lifter is transitioned from the high-lift state to the low-lift state and when manifold absolute pressure (MAP) is above a first threshold.

14. The method of claim 13 further comprising resetting the timer to zero when the MAP is above a second threshold.

15. The method of claim 13 further comprising resetting the timer to zero when the high-lift state is commanded.

16. A method of controlling a valve lifter comprising:
    determining a desired lift state of a valve lifter based on at least one of engine speed and engine load;
    transitioning the valve lifter from a low-lift state to a high-lift state based on manifold vacuum independently of the desired lift state; and
    transitioning the valve lifter from the low-lift state to the high-lift state based on signals from at least one of a hydraulic brake control module and a canister purge control module.

17. A method of controlling a valve lifter comprising:
    determining a desired lift state of a valve lifter based on at least one of engine speed and engine load;
    transitioning the valve lifter from a low-lift state to a high-lift state based on manifold vacuum independently of the desired lift state; and
    transitioning the valve lifter from the low-lift state to the high-lift state when a purge vapor concentration exceeds a predetermined value.

* * * * *